US006487252B1

(12) United States Patent
Kleider et al.

(10) Patent No.: US 6,487,252 B1
(45) Date of Patent: Nov. 26, 2002

(54) WIRELESS COMMUNICATION SYSTEM AND METHOD FOR SYNCHRONIZATION

(75) Inventors: John Eric Kleider, Scottsdale; Michael Eugene Humphrey, Chandler; Jeffery Scott Chuprun, Scottsdale; Chad Scott Bergstrom; Byron L. Tarver, both of Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/240,944

(22) Filed: Jan. 29, 1999

(51) Int. Cl.$^7$ ............................................. H04L 27/32
(52) U.S. Cl. ...................... 375/260; 375/142; 375/145; 375/149; 375/295; 375/316; 375/330; 375/342; 375/343; 375/355; 375/362; 375/364; 375/367; 370/320; 370/324; 370/330; 370/350; 370/481; 370/482; 370/503; 370/509; 370/513; 370/515
(58) Field of Search ................................ 375/142, 145, 375/146, 149, 240.28, 240.18, 260, 296, 326, 327, 330, 342, 343, 355, 362, 364, 365, 367; 370/319–320, 324, 330, 344, 342, 350, 465, 480, 481, 482, 503, 509, 510, 513, 515

(56) References Cited

U.S. PATENT DOCUMENTS

| | | | | |
|---|---|---|---|---|
| 4,945,549 A | * | 7/1990 | Simon et al. | 375/280 |
| 5,519,730 A | * | 5/1996 | Jasper et al. | 370/207 |
| 5,732,113 A | * | 3/1998 | Schmidl et al. | 375/354 |
| 5,901,180 A | * | 5/1999 | Aslanis et al. | 370/480 |
| 5,907,583 A | * | 5/1999 | Sakoda et al. | 375/260 |
| 5,953,311 A | * | 9/1999 | Davies et al. | 370/210 |
| 6,021,110 A | * | 2/2000 | McGibney | 370/203 |
| 6,272,168 B1 | * | 8/2001 | Lomp et al. | 370/342 |

OTHER PUBLICATIONS

Article entitled "COFDM: An Overview" by William Y. Zou and Yiyan Wu, IEEE Transactions on Broadcasting vol. 41, No. 1, Mar. 1995.

Article entitled "Modeling and Simulation of a OFDM Radio Link" by Robert J. Achatz, 1997 Wireless Communications Conference.

Article entitled "Simulation of OFDM for Mobile Wideband Network Architectures" by Michael E. Humphrey and John E. Kleider, Advanced Telecommunication and Information Distribution Research Program.

Article entitled "BER Sensitivity of OFDM Systems to Carrier Frequency Offset and Wiener Phase Noise" by Thierry Pollet, Mark Van Bladel and Marc Moneneclaey, IEEE Transactions on Communications, vol. 43, No. 2,3,4/ Feb./Mar./Apr. 1995.

Article entitled Robust Frequency and Timing Synchronization for OFDM by Timothy M. Schmidl and Donald C. Cox, IEEE Transactions on Communications, vol. 45, No. 12, Dec. 1997.

Article entitled "Frequency Synchronization Algorithms for OFDM Systems Suitable for Communication Over Frequency Selective Fading Channels" by Ferdinand Classen and Heinrich Meyr, IEEE 44$^{th}$ Vehicular Technology Conference, Jun. 1994.

Article entitled "Orthogonal Frequency Divison Multiplex Sychronisation Techniques For Wireless Local Area Network" by T. Keller and L. Hanzo, IEEE Transactions on Communications, Oct. 1996.

Article entitled "Analysis and Simulation of Digital Mobile Channel Using Orthogonal Frequency Division Multiplexing" by Leonard J. Cimini, Jr., IEEE Transactions on Communications, vol. Com–33, No. 7, Jul. 1995.

* cited by examiner

Primary Examiner—Jean Corrielus
Assistant Examiner—Khanh Cong Tran
(74) Attorney, Agent, or Firm—Gregory J. Gorrie; Maurice Jay Jones; Frank J. Bogacz

(57) ABSTRACT

An orthogonal frequency division multiplexed wideband communication system provides improved time and frequency synchronization by inserting an unevenly spaced pilot sequence within the constellation data. A receive correlates the received data using the unevenly spaced pilot sequence. The pilot sequence is generated with a maximum length pseudo random noise code and inserted into frequency bins having prime numbers.

19 Claims, 4 Drawing Sheets

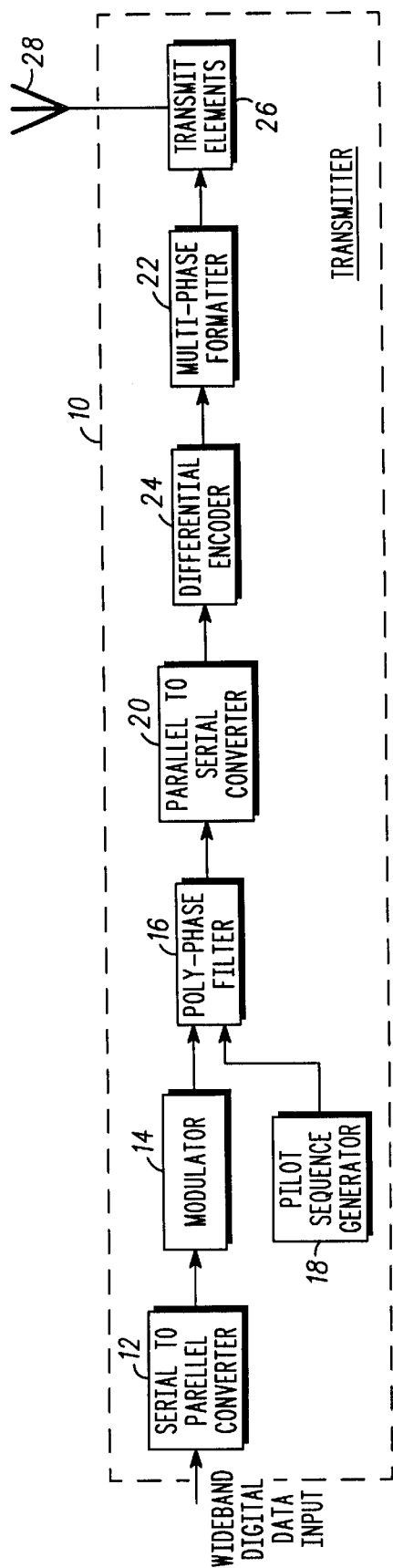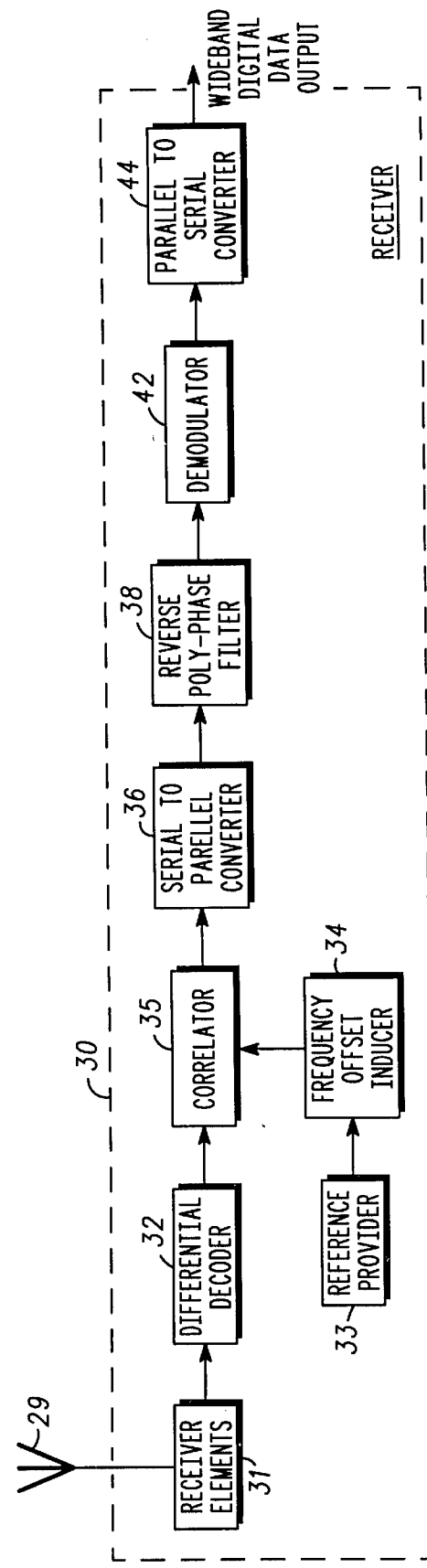

WIRELESS COMMUNICATION SYSTEM AND METHOD FOR SYNCHRONIZATION

FIELD OF THE INVENTION

This invention relates in general to the field of communication systems, in particular to orthogonal frequency division multiplexed (OFDM) communication systems and more particularly to an improved synchronization of OFDM communication systems.

BACKGROUND OF THE INVENTION

Transmission of wideband digital data has become necessary due to evolving standards for high definition television (HDTV), digital video broadcasting, and wideband data networks. Orthogonal Frequency Division Multiplexing (OFDM) is a way to enhance the performance of wideband wireless communication links degraded by co-channel interference, impulsive noise, and frequency-selective fading. In the past, implementation complexity slowed the development of OFDM for useful commercial and handheld applications. With recent advances in semiconductor processing technology and digital signal processing, OFDM is now practical for system solutions including wireless LANs, audio and television broadcast radio links, and land mobile services.

With the recent emergence of wideband cellular, and global satellite networks, a system and method are needed to provide synchronization of wideband wireless transmitted digital data which can be multiplexed onto a multicarrier waveform in a spectrally efficient manner. What is also needed is a system and method for digital synchronization that provides improved accurate timing and frequency tracking estimates for severely degraded and noisy channel environments. What is also needed is a method and system for synchronization correcting large timing misalignment of received multi-carrier waveforms, and provides acquisition of frequency offsets on the order of the RF signal bandwidth.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 1 is a simplified functional block diagram of a wideband data transmitter in accordance with a preferred embodiment of the present invention;

FIG. 3 is a simplified functional block diagram of a wideband data receiver in accordance with a preferred embodiment of the present invention;

Figure 2:
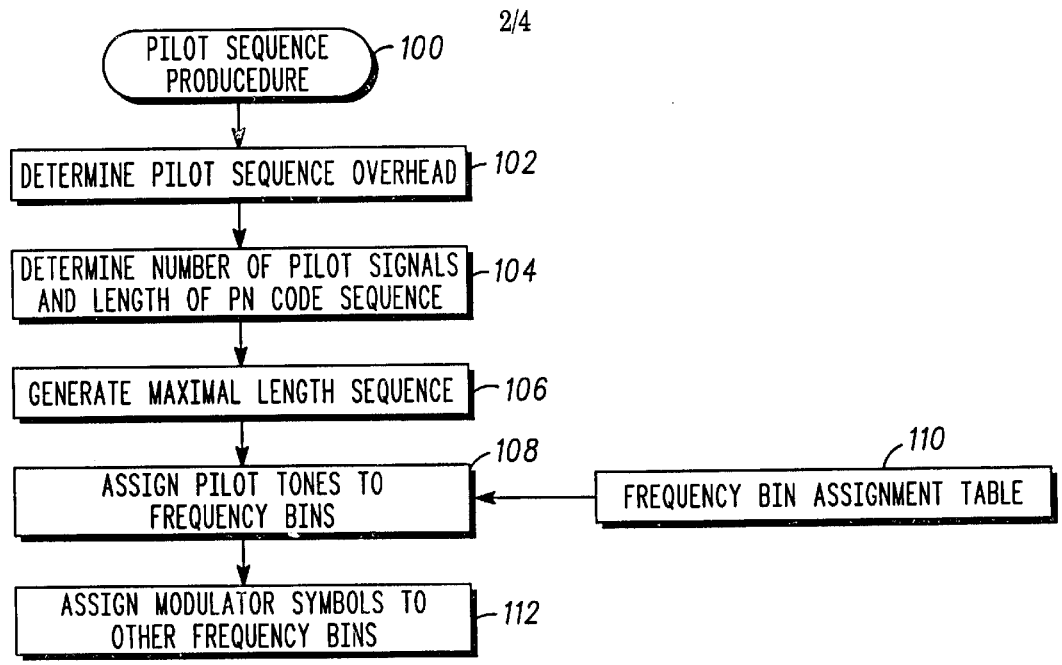
FIG. 2 is a simplified pilot sequence and assignment procedure in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, an accurate, efficient, and robust (e.g., operates in high receiver noise and fading) communication system and method of synchronization suitable for wireless reception of wideband and narrowband digital data. It may be implemented along with multiple popular modem waveforms, such as MPSK, MQAM, MRSK, and even MPPM, and is especially useful for video and wideband wireless networking applications.

Processing complexity is minimized, for example, by deriving timing and frequency error estimates from similiar processes, making it suitable to handheld, portable devices, such as radios. The estimation accuracy of the present invention is suitable for very low signal-to-noise ratios (SNR's). In the preferred embodiments, converging of the process occurs within one baud interval, which is suitable for systems requiring rapid time and frequency acquisition and symbol timing and oscillator frequency alignment at system startup. The method of the present invention may be implemented, for example, with fully digital receivers or with receivers using analog down-conversion circuitry. The low-complexity, high-accuracy, rapid, and robust synchronization method of the present invention helps provide a quality of service suitable for wideband transmission of diverse digital information for the various applications.

FIG. 1 is a simplified functional block diagram of a wideband data transmitter in accordance with a preferred embodiment of the present invention. Wideband transmitter 10 receives digital data and preferably wideband digital data. Serial to parallel converter 12, converts the wideband digital data to parallel form where modulator 14 operates on the parallel digital data. Modulator 14 converts the parallel data to symbols. Modulator 14, in accordance with the preferred embodiments of the present invention, preferably performs differential encoding on the modulation symbols. Any applicable modulation, such as D4PSK 16QAM are suitable for the present invention. The specific type of modulation may depend on the type of data, for example, voice or video and may also depend on the bit error rate (BER) requirements for the data. In one embodiment of the present invention, modulator 14 is comprised of a plurality of one or more modulators which may be of various types for operating on the different types of data.

Polyphase filter 16 performs an inverse fast Fourier transform (FFT) on the symbols provided by the modulator and provides an output of a plurality of composite signals represented on one waveform. In the preferred embodiment of the present invention, polyphase filter 16 is a Radix 2 FFT. Pilot sequence generator 18 provides a plurality of pilot tones assigned to frequency bins not occupied by constellation data provided by modulator 14. Preferably, the pilot tones provided by pilot generator 18 are provided at the same envelope value as the constellation data from modulator 14. In accordance with the present invention, the pilot tones are assigned unevenly across the frequency bins which are operated on by polyphase filter 16. The process for generating the pilot tone sequence and assigning them to frequency bins is discussed below.

Parallel to serial converter converts each block, vector, or group of the digital samples provided by polyphase filter 16 to serial data providing the example sequentially in time to multi-path formatter 22. Multi-path formatter 22, in accordance with a preferred embodiment of the present invention, adds cyclic an extension to the serial data to help prevent loss of orthogonality caused by multi-path interference at the receiver.

Transmitter elements 26 include other functional elements for providing a signal for transmission to antenna 28. For example, transmitter elements 26 preferably include a pulse shaper for minimizing spectral side lobes and may also include an up sampler, a digital to analog converter, an up converter, and one or more RF amplifiers and filters. The signal is then transmitted by antenna 28, preferably through an RF channel or link and most preferably through an orthogonal frequency division multiplexing (OFDM) channel. Wideband transmitter 10 is suitable for transmitting high data rate data, for example, between one megabit per second and up to twenty megabits per second or higher. Wideband transmitter 10 is also suitable for multiplexing low data rate data to high data rate trunked data or simply low rate data for signal which do not require wide transmission bandwidths. Wideband transmitter 10 may also be suitable for use in base stations and portable telecommunication devices.

FIG. 2 is a simplified pilot sequence and assignment procedure in accordance with a preferred embodiment of the present invention. Task 102 determines the pilot sequence overhead. In general, this may be viewed as a percent of the available frequency bins used for information that will be occupied by pilot sequence tones. The pilot sequence overhead, the exact value depends on the synchronization performance desired at the receiver. Pilot sequence overhead may range from 0.01% for up to 100% for performing time and frequency alignment in certain situations. Typically, for data transmission, the pilot sequence overhead is between 1 and 10%.

In task 104, the number of pilot signals is determined by multiplying the pilot sequence overhead percent by the number of sub-channels, for example. This number of pilot channels will correspond with the length of a PN (pseudo noise) code sequence used to generate the pilot tones. In task 106, a sequence of that length is generated. Maximal length sequences or any suitable pseudo-noise (PN) sequence may be used for the pilot sequence. Preferably, the sequence is chosen to improve the autocorrelation and peak to side lobe properties of the pilot sequence. The pilot sequence can be real or complex valued, represented by having real and/or imaginary components.

In task 108, the generated pilot tones are assigned to frequency bins. In the preferred embodiment of the present invention, a frequency bin assignment table 110, is used although other ways of assigning pilot tones to frequency bins are also suitable. Task 112, although not performed by pilot sequence generator 18, assigns the modulator symbols, for example, provided by modulator 14 (FIG. 1) to other frequency bins not assigned to pilot tones. Task 112, shown here for clarity is performed independently of tasks 102 through 110. Tasks 102 through 108 may be performed by digital signal processing techniques of processors and memory within pilot sequence generator 18. Frequency bin assignment table 110 shows the frequency bin locations in which to put a pilot tone. In accordance with the present invention these frequency bins are unevenly spaced and preferably correspond with prime numbered frequency bin locations that are approximately the same distance (in frequency) apart as evenly spaced pilot sequence would be. In accordance with the preferred embodiments of the present invention, the less pilot tones that are used the more the spacing is uneven.

In one preferred embodiment of the present invention, the number of pilot tones is determined dynamically in response to channel characteristics such that the number of pilot tones is increased, for example, when the signal to noise ratio decreases or the bit error rate increases. On the other hand, the number of pilot tones is reduced dynamically with improved signal to noise ratio or reduced bit error rates. This is discussed in more detail below. Polyphase filter 16 performs an inverse FFT on the combined pilot sequence and symbol data as assigned to frequency bins provided from the modulator 14 and pilot sequence generator 18.

FIG. 3 is a simplified functional block diagram of a wideband data receiver in accordance with a preferred embodiment of the present invention. Wideband receiver 30 receives data over a wideband communication link through antenna 29. Receiver elements 31 include the elements for converting the received information to digital data. Receiver elements 31 preferably provide sequential digital samples at the same data rate as were provided to transmitter elements 26. In one embodiment of the present invention, a differential encoder 24 is included in wideband transmitter 10 and a differential decoder 32 is included in wideband receiver 30. Differential decoder 32, among other things, removes frequency offset on the received signal which may result, for example, as a result of a difference in local oscillator frequencies between receiver and transmitter. Differential decoder 32 provides frequency corrected data that is comprised of both the pilot tone and data symbols transmitted by wideband transmitter 10. When differential encoder 24 and differential decoder 32 are not a included, receiver elements 31 provide digital data in a serial format that is comprised of the pilot tone and digital symbol information transmitted by wideband transmitter 10, but is not frequency corrected by differential decoder 32.

Correlator 35 correlates the received data with a known reference signal. The known reference signal is preferably the pilot sequence which may be generated or pre-stored in receiver 30. Correlator 35 provides correlated data to serial to parallel converter 36 which converts the data to parallel form wherein reverse polyphase filter 38 performs an FFT on the parallel data which is demodulated (converted from symbols to bits) and provided to parallel to serial converter 44 which provides a serial output for receiver 30. When time aligned and frequency aligned, the output digital data should correspond with the input digital data to transmitter 10. Reference provider 33 provides the referenced signal for correlator 35. Reference provider 33 preferably generates pilot tones in accordance with pilot sequence procedure 100 and assigned such pilot tones to frequency bins in accordance with the procedure. Accordingly, reference provider 33 also includes a frequency bins assignment table.

In one preferred embodiment of the present invention, a frequency offset inducer 34 is included to induce frequency offset on the reference signal prior to correlation. In this embodiment, any timing offset on the received information is removed by inducing a frequency offset on the pilot sequence and correlating with the received data. Preferably, the frequency offset is induced a step at a time and the frequency offset having the best correlation is selected as the most likely frequency offset to use. Preferably, the process of inducing a stepped frequency offset on the pilot sequence is done once for each composite signal boundary (each block). Accordingly, once the amount of frequency offset induced is determined for the best correlation, the received data is correlated with the reference signal fixed with this amount of frequency offset. Fine oscillator frequency corrections can be made, if necessary, using the frequency tracking algorithm.

Figure 4:
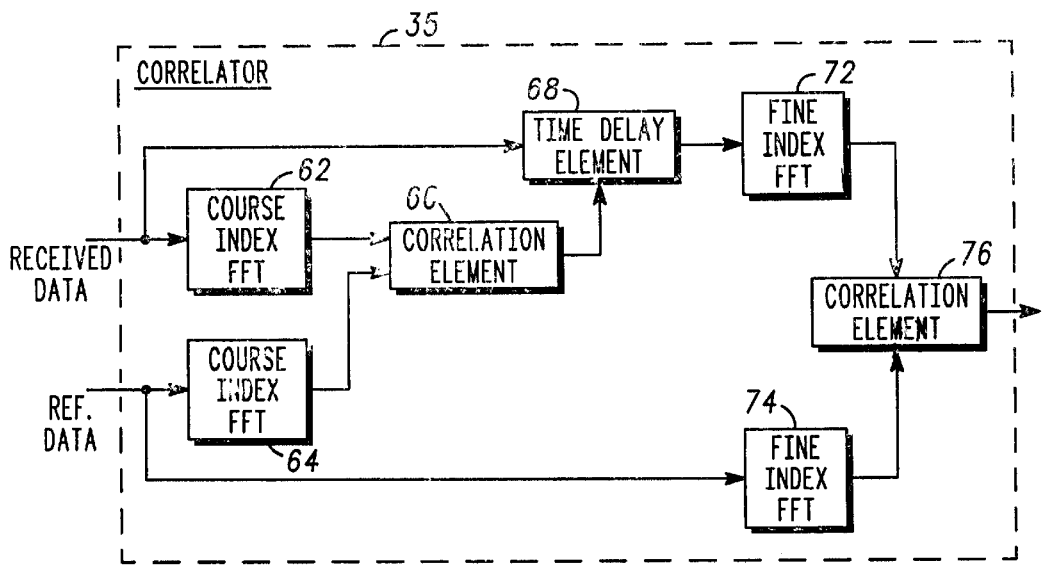
FIG. 4 is a simplified functional block diagram of a correlator in accordance with a preferred embodiment of the present invention.

FIG. 4 is a simplified functional block diagram of a correlator in accordance with a preferred embodiment of the present invention. Correlator 35 (FIG. 4) discloses yet another embodiment of the present invention for, among other things, the removal of time offset from the received data. Correlator 35 may be used in conjunction with the other embodiments of the present invention, for example, for removing frequency offset. Correlator 35 of FIG. 4, includes course index FFTs 62 and 64 for performing in FFT on the received and referenced data, respectively. The reference data, for example, is provided by reference provider 33 and is preferably comprised of the pilot sequence and associated frequency bins discussed above. Correlation element 66 performs a correlation which is used to determine an estimated time delay for delaying the received data. Correlation element 66 multiplies input from FFT 62 by the complex conjugate of the input from FFT 64, performs an inverse FFT, and the time index corresponding to the maximum value is the estimated time delay.

Time delay element 68 delays the received data and provides it to fine index FFT 72 which is used to correlate the delayed received data in correlation element 66 with the reference data after being operated on by fine index FFT 74. In the preferred embodiment, when fine index FFT 72 and 74 are n-point FFTs course index FFT 62 and 64 may, for example, be n over 2 point FFTs. The exact index for course index FFTs depends on the anticipated frequency offset. Correlation element 76 multiples input from FFT 72 by the complex conjugate of the input from FFT 74, performs an inverse FFT, and the fine time index corresponding to the maximum value is the estimated time delay.

Figure 5:
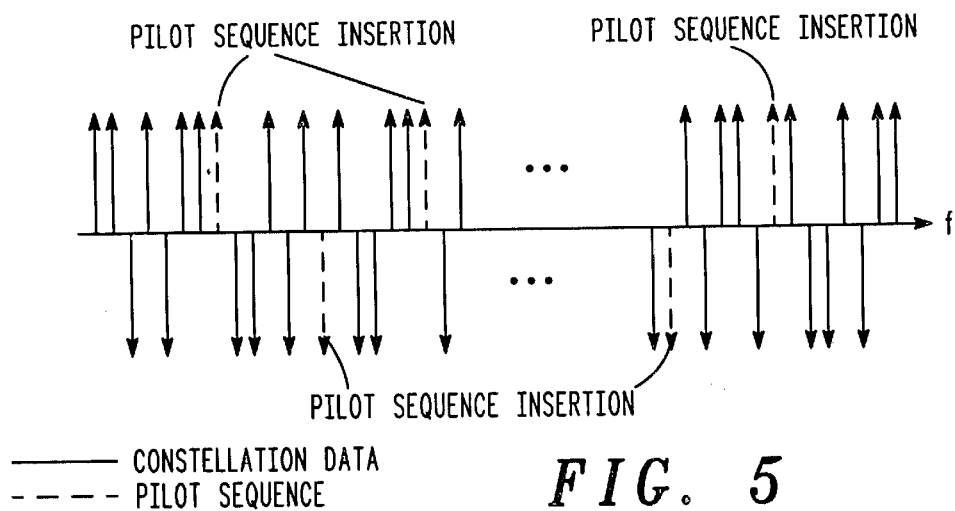
FIG. 5 is a simplified illustration showing pilot sequence insertion within constellation data in accordance with a preferred embodiment of the present invention.

FIG. 5 is a simplified illustration showing pilot sequence insertion within constellation data in accordance with a preferred embodiment of the present invention. FIG. 5 illustrates constellation data 52 and pilot sequence 54 interspersed unevenly through the constellation data. The symbols provided to polyphase filter 16 are shown which result from the formation of the pilot symbol sequence, and the insertion of the pilot sequence into the modulated data waveform, for a real valued sequence.

In accordance with a preferred embodiment, one function of the system of FIG. 1 is to convert digital data from a digital data source (or multiple sources), such as a speech, image, or video coder, and appropriately modulate and multiplex the symbols from the modulator so that the information may be transmitted over a RF channel. FIG. 1 illustrates one embodiment of a transmitter that includes OFDM waveform generator implemented using a polyphase filter structure. The modulator 14 is preferably a performed quadrature modulation, such as QPSK or 16QAM. The polyphase filter 16 performs a polyphase filter operation, such as inverse FFT, and implements a modulated OFDM waveform using an FFT. The multi-path formatter 22 preferably includes a pulse shaper that helps minimize performance degradations due to orthogonality impairments, such as when the waveform is transmitted through a multi-path fading channel. Shaping an extended data block helps reduce the side-lobes of the transmitted spectrum.

Pilot symbols, for example, aid in the synchronization processes for symbol timing (acquisition), clock recovery offset, frequency tracking, and frequency acquisition. A pilot sequence is inserted into the multiplexor along with the modulator data output (i.e. constellation data) (See FIG. 5). The pilot sequence is interspersed within the constellation data as shown, for example in FIG. 5. Maximal-length sequences (m-sequences) or suitable pseudo-noise (PN) sequences may be used for the pilot sequence. The sequence is preferably chosen to improve the autocorrelation peak-to-sidelobe properties of the pilot sequence. The pilots are typically chosen to be evenly spaced across the entire frequency range. However, in accordance with the present invention, an unequal spacing between each pilot tone in the sequence is used. This technique to improves, among other things, the autocorrelation peak-to-sidelobe ratio.

For example, if the correlation function of a real (or complex) sequence P(0), P(1), . . . , P(m−1) of length m is defined by $$a(n) = \sum_{k=0}^{m-1} P(k)P(n+k)^*, \quad n = 0, \pm 1, \pm 2, \quad (1)$$

then $$a_e(n) = \sum_{k=0}^{m-1} P_e(k)P_e(n+k)^*, \quad n = 0, \pm 1, \pm 2, \quad (2)$$

and $$a_u(n) = \sum_{k=0}^{m-1} P_u(k)P_u(n+k)^*, \quad n = 0, \pm 1, \pm 2, \quad (3)$$

where $P_e(k)$ and $P_u(k)$ are given by the even and unevenly spaced pilot sequences, respectively. $a_e(n)$ and $a_u(n)$ are then the correlation functions of $P_e(k)$ and $P_u(k)$, respectively. The asterisk denotes the complex conjugate operator. A higher peak-to-sidelobe ratio will improve correlator performance in noise, and thus improves synchronization accuracy for low SNR's, co-channel interference, and multi-user interference. A typical OFDM block size is N=1024, and a typical total pilot overhead would be approximately 4.1%.

Generally, the synchronization process for any system, independent of the multiplexing method, uses a frequency synchronization process and a time synchronization process. At system power up, nothing may be known about timing or frequency error. The synchronization method of the present invention provides convergence in the presence of initial timing- and frequency-errors. Assuming frame timing is an independent process, although frame timing is easily accommodated, an OFDM time synchronizer aligns the polyphase filter window with the samples of the received signal.

The primary role of a frequency synchronizer is to estimate frequency error in the received signal. This estimate is used, for example, to adjust the receiver local oscillator. This is important for OFDM systems because frequency error degrades the orthogonal properties between sub-channels (sub-carriers) causing inter-carrier interference. Frequency synchronization is performed in two steps: 1) frequency acquisition, and 2) frequency tracking. Frequency acquisition is typically more complex than frequency tracking, due to the capability to estimate large frequency error.

Figure 6:
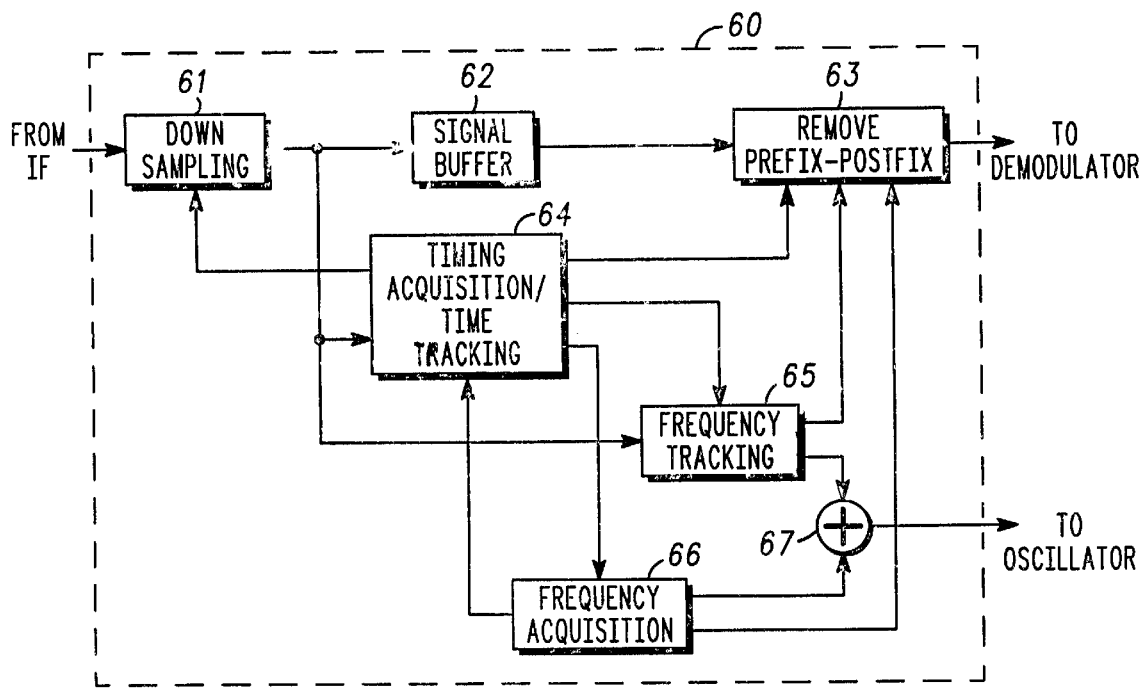
FIG. 6 is a simplified synchronizer system functional block diagram in accordance with the embodiments of the present invention.

FIG. 6 is a simplified synchronizer system functional block diagram in accordance with the embodiments of the present invention. In reference to FIG. 6, down-sampling and clock recovery are performed functionally in element 61. Suitable ways of performing down-sampling and clock recovery are known in the art and are not to be discussed here. Preferably the down-sampling process provides sampling instant offset estimates to aid the clock recovery unit to more closely match an optimal sampling instant of the transmitter. Time acquisition element 64 controls frequency tracking element 65 frequency acquisition, element 66, and remove prefix-postfix element 63. While the frequency synchronization operation depends on timing acquisition, frequency acquisition and preferably performed independently. Timing acquisition controls the time domain alignment of the FFT window at the receiver element 63. Correct alignment removes both the postfix and prefix. The prefix is generally a cyclic extension of the signal output from the polyphase filter structure and may be added by multi-path formatter 22 as shown in FIG. 1. The prefix is appended to the last digital sample of the output of the polyphase filter. The postfix is also a cyclic extension, but is appended prior to the first digital sample output from the polyphase filter. Time domain pulse shaping is used to reduce out-of-band sidelobe levels. Note that signal buffer 62 is used to temporarily hold the received signal and allow processing of the timing acquisition element and time tracking element 64, frequency acquisition element 66 and frequency tracking element 65 output controls signals to reach remove postprefix element 63. As mentioned above, time tracking element 64 provides an estimate of the optimum sampling instant. The output relationships of the time and frequency estimation processes are discussed below which may be implemented, for example with digital signal processors and digital signal processing techniques.

The time and frequency estimation processes of the present invention, for example, take advantage of a-priori knowledge of the synchronization (pilot) sequence. The repetitive properties of the transmitted symbols, for example the correlative properties between the polyphase filter output symbol and cyclic extension may also be used.

Y(n) is the received multi-carrier symbol, and the synchronization processes depend primarily on the computation of the following discrete correlation function in time:

$$r(m) = \sum_{n=0}^{N+N_{ce}-1} y(n)\overline{p}(n+m)^*, \quad (4)$$

where the bar over p(n) indicates periodicity, denoted as $\overline{p}(n)$, or $$\text{periodic } \overline{p}(n + jL) = p(n); \quad (5)$$
$$n = 0, 1, \ldots, L-1$$
$$j = 0, \pm 1, \ldots, \pm \infty$$

N is the number of sub-carriers in each transmitted symbol, $N_{ce}$ is the length of the cyclic extension (postfix and prefix), and p(n) is the time domain equivalent of the pilot sequence. r(m) is used for both the polyphase filter symbol window alignment and frequency tracking. Due to limited capture range of the frequency tracking estimation process, frequency acquisition is accomplished preferably by performing a discrete correlation in the frequency domain, represented by $$S(l) = \sum_{k=0}^{N+N_{ce}-1} Y(k)\overline{P}(k+l), \quad (6)$$

where Y(k)=F[y(n)] and $\overline{P}$(k) is the pilot sequence with the bar indicating P(k) with periodicity, and "F" is the Fourier transform operator. These relationships are utilized for each of the synchronization processes described below.

The discrete lag of the maximum magnitude of r(m) is used to estimate the symbol alignment error. In other embodiments, the maximum of the real part of r(m) is used to estimate the symbol alignment error. The discrete Fourier transform (DFT) of the correlation function is a product of two DFTs, and when eq. 4 represents the correlation, then $$\overline{R}(n) = \overline{Y}(n)\overline{P}(n); \quad n=0,1,\ldots,N+N_{ce}-1 \quad (7)$$

The bar represents the periodic extension. Using eq. 7 the symbol acquisition estimation process is equivalent to $$TA = \text{argmax}\{\text{mag}(F^{-1}[F[y]\cdot P])\}, \quad (8)$$

where mag(·) represents the magnitude, and $F^{-1}[\cdot]$ denotes the inverse Fourier transform operation. TA represents the index location where magnitude of the correlation function is maximum.

As the samples of y(n) are received, any carrier frequency error $f_\delta$ results in a changing phase error φ(n) or $$\phi(f_\delta, n) = 2\cdot f_\delta \cdot n \cdot T_s = 2\cdot(f\cdot n/N\cdot f_\Delta), \quad (9)$$

where $T_s$ is the sample interval, and $f_\Delta$ is the sub-carrier spacing. The phase error difference between two received samples y(n) and y(n+1) is a function of the frequency error and their time delay. The phase error difference is written as:

$$\Delta\phi = \phi(f_\delta, n) - \phi(0, n) = \phi(f_\delta, n) - \theta, \quad (10)$$

where θ represents an all zeros vector at each index n within the function $\phi(f_\delta, n)$. The phase difference error can be used to determine the frequency error $f_\delta$.

The phase of TA (eq. 8) equals the averaged phase shift between the received samples of y(n) and the pilot sequence. Eq. 10 can be rewritten as $$\Delta\phi = \sum_{n=0}^{N-1} 2\pi f_\delta n / N f_\Delta. \quad (11)$$

Eq. 11 represents the sum of all the phase errors for n=1, 2, ... N−1. Dividing this result by (N−1) provides the average phase shift. Using the sum of powers of the first n integers, eq. 11 can be greatly simplified. We can equate the simplified result to ∠TA which gives $$f_\delta = \frac{f_\Delta}{\pi} \cdot \angle TA, \quad (12)$$

where $f_\delta$ represents the fine frequency error estimate. ∠TA can be defined by the following equation:

$$\angle TA = \underset{\text{arg}=TS}{angle}\{F^{-1}[F[y]\cdot P]\}. \quad (13)$$

Eq. 12 is then able to provide a tracking range of approximately $f_\Delta$.

For frequency acquisition, the discrete lag of the maximum magnitude of S(1) is preferably used to estimate the offset because the correlation is performed in the frequency domain. In other embodiments, the maximum of the real part of S(e) is used to estimate the frequency offset (or alignment error). Frequency resolution of eq. 6 is $f_\Delta$ because the lags occur at discrete frequencies. FA has the capability to estimate course frequency error with a capture range on the order of the total OFDM symbol bandwidth. The complexity is reduced significantly when the frequency error due to local oscillator and/or Doppler shifts is less than some multiple of the sub-carrier spacing. The acquisition process may also use a relation similar to eq. 7, instead using the inverse DFT. In this case, the acquisition process is expressed as:

$$FA = argmax\{mag(F[y \cdot F^{-1}[P]])\}. \quad (14)$$

With a maximum FA capture range on the order of N sub-carrier spacings, the course acquisition estimate, $f_a$, can be written as $$f_a = FA \cdot f_\Delta, \quad (15)$$

where FA represents the course offset as an integer multiple of the sub-carrier spacing. $f_a$ is as wide as multiple sub-carrier spacings, with an estimation error $\leq f_*/2$. Note that this is sufficient, given that the maximum tracking range from eq. 12 is approximately $f_\Delta$.

For time tracking, as the samples of Y(k) are received, where Y(k)=F[y(n)], any fractional timing error $t_\delta$ results in a changing phase error $\psi(k)$ or $$\psi(t_{67}, k) = 2 \cdot t_\delta \cdot k \cdot f_\Delta = 2 \cdot (t_\delta \cdot k / N \cdot T_s), \quad (16)$$

where $T_s$ is the sample interval, and $f_\Delta$ is the sub-carrier spacing. The phase error difference between two received samples Y(k) and Y(k+1) is a function of the fractional timing error and their frequency difference. For our process, there is no frequency difference between the received samples and the pilot sequence, so the phase error difference is written as $$\Delta\psi = \psi(t_\delta, k) - \psi(0, k) = \psi(t_\delta, k) - \Lambda, \quad (17)$$

where $\Lambda$ represents an all zeros vector at each index k within the function $\psi(t_\delta, k)$. Assuming there are no other significant timing distortion effects, the phase difference error is preferably used to determine the tracking error $t_\delta$.

The phase of FA (eq. 8) equals the averaged phase shift between the received samples of Y(k) and the pilot sequence. Eq. 10 can be rewritten as $$\Delta\Psi = \sum_{k=0}^{N-1} 2\pi t_\delta k / NT_s. \quad (18)$$

Eq. 18 represents the sum of all the phase errors for k=1, 2, . . . N−1. Dividing this result by (N−1) provides the average phase shift. The sum of powers of the first k integers, in eq. 18 is preferably used. The simplified result for ∠TA gives $$t_\delta = \frac{T_s}{\pi} \cdot LTA, \quad (19)$$

where $t_*$ represents the fine fractional timing tracking offset. ∠TA is defined by the following equation:

$$LTA = \underset{\text{arg}=FA}{angle}\{F[y \cdot F^{-1}[P]]\}. \quad (20)$$

Eq. 20 is able to provide a tracking range of approximately $T_s$.

Because of the structure of the design of this synchronization method, there are many adaptive properties that require some clarification. First, based on the pilot insertion structure shown in FIG. 1, during extremely low received signal levels, additional performance can easily be accommodated by a modest increase in the pilot overhead. This can be a purely variable parameter by providing channel quality estimates to the transmitter as estimated by the receiver. One embodiment provides a dynamically changing overhead. This provides at least two advantages, it maximizes the data throughput for good channels and optimizes the needed amount of reference information for received signals under low channel SNRs.

FIG. 7 illustrates an example of window lengths used for prediction of current and future offsets in accordance with a preferred embodiment of the present invention. FIG. 7 shows an example of y(n) with multiple measurement interval lengths is described in accordance with a preferred embodiment of the present invention. Although this has been described for a time-domain signal, the multi-resolution embodiment applies to the frequency domain estimation processes as described above. One purpose of the multi-resolution approach is to provide both shorter- and longer-term averages of the timing and frequency offset errors. The appropriate resolution is chosen given the drift characteristics of the system for both timing and frequency. This multi-resolution embodiment then lends itself to provide intra-signal correlation, that is the estimator takes advantage of correlation in the oscillator and timing clock drift properties within a signal and between received signals.

An estimator operating on the received signal is utilized to confirm inter-signal drift correlation on the shorter signals. In a similar way an estimator operating on a longer received signal is utilized to confirm any inter-signal drift correlation on the signals represented in the received time domain signal.

Figure 7A:
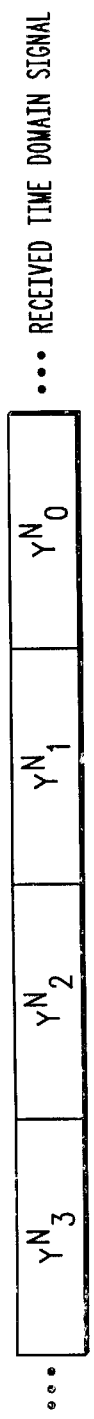
FIG. 7 illustrates an example of window lengths used for prediction of current and future offsets in accordance with a preferred embodiment of the present invention.
Figure 7B:
Figure 7C:
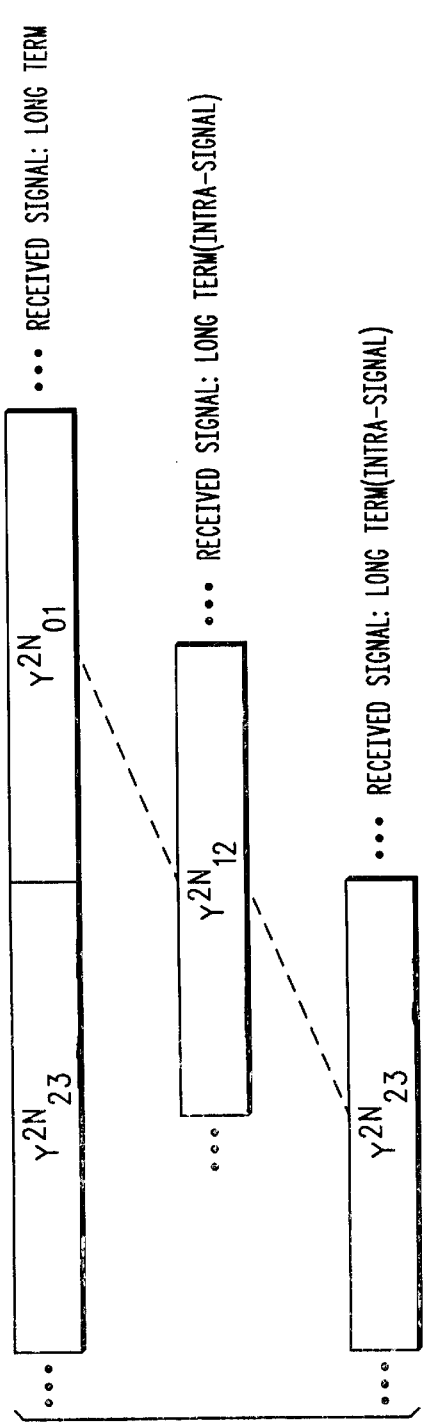

FIG. 7a) shows a typical estimator measurement window length N, illustrating embodiments of the present invention. FIG. 7b) and c) show the shorter- and longer-term signal interval lengths, respectively. An estimator operating on the received signal as shown in FIG. 7a) is utilized to confirm any inter-signal drift correlation on the signals represented in FIG. 7b). In a similar way an estimator operating on the received signal as shown in FIG. 7c) is be utilized to confirm any inter-signal drift correlation on the signals represented in FIG. 7a). FIG. 7c) shows an overlapping windowed structure.

An overlapping windowed structure is preferably used to ensure that the long-term estimator updates the estimate for each multi-carrier signal $y_n^N$ that is received. The inter-signal estimator, preferably updates its estimate for each $y_{nl}^{N/2}$, where l=0,1.

One embodiment of the present invention includes an estimator predictor. One primary purpose of the predictor is to minimize the impact of wideband fading and severe signal loss due to propagation impairments. In the event of very low received SNR, the correlation process may be insufficient to provide an accurate estimate for the currently received signal. The predictor can, therefore, provide an estimate of the current (and future) timing and frequency offset, independent of the estimation of the correlation processes from the currently received signal. The current estimate can be viewed as a weighted average of past measured offset values, while future estimates can be predicted based on a weighted average of current and past values.

In general, a polynomial predictor is preferred for drift characteristics which exhibit nonlinear tendencies with both positive and negative slopes. For this condition a curve fit is performed such that an error measure is minimized. For methods which utilize least squares curve fitting, a set of data points $(t_n, FT_n)$ and/or $(t_n, TT_n)$ forming a function can be fit using a polynomial of order M by minimizing the mean square error E according to:

$$E_{FT}^N = \sum_{n=0}^{P-1} W_n^2 [c_0 + c_1 t_n + c_1 t_n^2 + \ldots + c_M t_n^M - FT_n]^2 \quad (21)$$

where:
$W_n$=the weight value associated with the $(t_n, FT_n)$ data point.
P=the number of data points $(t_n, FT_n)$ for n=0 to P−1.
M=the order of the polynomial fit.
$C_k$=the desired polynomial coefficients (0 to P).
$EN_{FT}^N$=total mean square error for the FT prediction estimator operating on signal $y_n^N$ from FIG. 7a).

Note that a similar relation can be developed for time tracking (TT). The weight values (We) are used to weight the squared error for each data sample. The $W_n$ can be chosen to be proportional to the inverse of the standard deviation of the $FT_n$ measurements (if the $FT_n$ data samples are normally distributed). If a particular sample is noisier than another, the noisy sample contributes less to the minimum mean squared error. This helps improve the prediction accuracy for estimates that occur when the channel is bad.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A wireless communication system comprising:
   a transmitter and a receiver coupled by an communication link, the transmitter comprising:
   a modulator element for converting digital data to symbols, said symbols being assigned to frequency bins of a set of frequency bins;
   a pilot tone generator for generating a sequence of pilot tones, each pilot tone being associated with frequency bins not assigned to symbols from said modulator element, the frequency bins assigned to said pilot tones being unevenly spaced therebetween;
   a polyphase filter for performing an inverse fast Fourier transform (FFT) on the symbols assigned to said set frequency bins and providing a plurality of output samples;
   a transmitting portion for transmitting the plurality of output samples over the communication link;
   the receiver comprises a correlator for correlating the plurality of output samples received over the communication link with a reference for use in retrieving said digital data, said reference comprising said sequence of pilot tones associated with the unassigned frequency bins; and
   the pilot tone generator includes a pilot tone location assignment table identifying said frequency bins assigned to each pilot tone.

2. A system as claimed in claim 1 wherein the pilot tone generator generates said sequence of pilot tones based on a pseudo-noise (PN) sequence having a sequence length, said sequence length corresponding to a number pilot tones of said sequence of pilot tone.

3. A system as claimed in claim 1 wherein said pilot tone location assignment table identifies frequency bins, at least some having locations associated with prime numbered bins of said set of frequency bins.

4. A system as claimed in claim 3 wherein said receiver further comprises a receiver pilot tone generator for generating said sequence of pilot tones for said reference.

5. A system as claimed in claim 3 wherein said receiver further comprises a memory for storing said sequence of pilot tones and said pilot tone location assignment table.

6. A system as claimed in claim 1 wherein the correlator further comprises:
   means for adding a stepped frequency offset said reference producing a frequency offset reference;
   means for correlating the plurality of output samples received over the communication link with each stepped frequency offset reference for use in retrieving said digital data.

7. A system as claimed in claim 1 wherein the correlator further comprises:
   a first FFT element for performing a course Fourier transform on the plurality of output samples received over the communication link, the first FFT element providing a time delay;
   a delay element for delaying the plurality of output samples received over the communication link by said time delay;
   a second FFT element for performing a fine Fourier Transform on the delayed plurality of output samples; and means for correlating the delayed plurality of output samples received over the communication link with said reference to retrieve said digital data.

8. A system as claimed in claim 7 wherein the fine Fourier transform is the substantially the same resolution as the inverse FFT performed by the polyphase filter, the course Fourier transform having less resolution than said fine Fourier transform.

9. A system as claimed in claim 1 wherein the receiver further comprises:
   a FFT element for performing a Fourier transform on correlated data provided by said correlator and providing channelized data;
   a demodulator for operating on the channelized data, the channelized data substantially corresponding with said parallel digital data converted by said modulator.

10. A system as claimed in claim 1 wherein the modulator element comprises a plurality of modulators, at least a one modulator of the plurality being of a first type for operating on voice data, and at least one other modulator of the plurality being of a second type for operating on video data, the voice and video data being present in the digital data, each modulator of the plurality providing said symbols to said polyphase filter.

11. A system as claimed in claim 1 wherein the transmitter further comprises:
   a serial to parallel converter for converting sequential digital data from sequential to parallel digital data, and providing said parallel digital data to said modulator element;
   a parallel to serial converter for converting the plurality of output samples provided by said polyphase filter to serial digital data, said transmitting portion transmitting said serial digital data; and
   a multi-path formatter for adding a cyclic extension to said serial digital data prior to transmission by said transmitting portion.

12. A system as claimed in claim 1 wherein:
   the transmitter further comprises a differential encoder for differentially encoding the plurality of output samples provided by the polyphase filter, and
   the receiver further comprises a differential decoder for differentially decoding the serial digital data received over the communication link and providing differentially decoded data, said differentially decoded data being corrected for frequency offset associated with said serial digital data received over the communication link.

13. A method of communicating comprising the steps of:
   converting digital data to symbols, said symbols being assigned to frequency bins of a set of frequency bins;
   generating a sequence of pilot tones, each pilot tone being associated with frequency bins not assigned to symbols from said modulator element, the frequency bins assigned to said pilot tones being unevenly spaced therebetween;
   performing an inverse fast Fourier transfer (FFT) on the symbols assigned to said set frequency bins and providing a plurality of output samples; and
   transmitting the plurality of output samples over a communication link;
   correlating the plurality of output samples received over the communication link with a reference for use in retrieving said digital data, said reference comprising said sequence of pilot tones associated with unassigned frequency bins; and
   the generating step includes the step of reading a pilot tone location assignment table identifying said frequency bins assigned to each pilot tone.

14. A method as claimed in claim 13 wherein the generating step includes the step of generating said sequence of pilot tones based on a pseudo-noise (PN) sequence having a sequence length, said sequence length corresponding to a number pilot tones of said sequence of pilot tones.

15. A method as claimed in claim 13 wherein the reading step, said pilot tone location assignment table identifies frequency bins, at least some having locations associated with prime numbered bins of said set of frequency bins.

16. A method as claimed in claim 15 further comprising the step of generating said sequence of pilot tones for said reference.

17. A method as claimed in claim 15 further comprising the step of storing said sequence of pilot tones and said pilot tone location assignment table.

18. A method as claimed in claim 13 further comprising the steps of:
   adding a stepped frequency offset said reference producing a frequency offset reference;
   correlating the plurality of output samples received over the communication link with each stepped frequency offset reference for use in retrieving said digital data.

19. A method as claimed in claim 13 wherein the correlating step further comprises:
   performing a course Fourier transform on the plurality of output samples received over the communication link to provide a time delay;
   delaying the plurality of output samples received over the communication link by said time delay;
   performing a fine Fourier Transform on the delayed plurality of output samples; and
   correlating the delayed plurality of output samples received over the communication link with said reference to retrieve said digital data.

* * * * *